(12) United States Patent  (10) Patent No.: US 7,403,709 B2
Miyazaki et al.  (45) Date of Patent: Jul. 22, 2008

(54) STRUCTURE FOR ATTACHING STEREOSCOPIC CAMERA IN VEHICLE

(75) Inventors: Yasuaki Miyazaki, Utsunomiya (JP);
 Hiroshi Hattori, Utsunomiya (JP);
 Masahito Watanabe, Utsunomiya (JP);
 Nobuharu Nagaoka, Nasu-gun (JP);
 Yoshitaka Katashima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 11/243,204

(22) Filed: Oct. 4, 2005

(65) Prior Publication Data

US 2006/0072917 A1 Apr. 6, 2006

(30) Foreign Application Priority Data

Oct. 6, 2004 (JP) .............................. 2004-293576

(51) Int. Cl.
 *G03B 35/00* (2006.01)
 *G03B 35/18* (2006.01)
 *G03B 29/00* (2006.01)

(52) U.S. Cl. ...................... 396/325; 396/324; 396/322; 348/42; 348/47

(58) Field of Classification Search ................. 396/419, 396/424, 427, 429, 325, 324, 322; 348/42, 348/47, 118, 837; 382/104; 701/28
 See application file for complete search history.

(56) References Cited

U.S. PATENT DOCUMENTS 4,277,804 A * 7/1981 Robison ...................... 348/148
 6,811,330 B1 * 11/2004 Tozawa ....................... 396/428
 2002/0125383 A1 * 9/2002 Takahashi .................... 248/200
 2004/0208497 A1 10/2004 Seger et al.

FOREIGN PATENT DOCUMENTS

DE 10162652 7/2003
 EP 1086859 3/2001
 JP 11-301365 11/1999
 JP 2001-088623 4/2001
 JP 2001-233139 8/2001

* cited by examiner

*Primary Examiner*—W. B. Perkey
 *Assistant Examiner*—Anthony Weathers
 (74) *Attorney, Agent, or Firm*—Carrier, Blackman & Associates, P.C.; Joseph P. Carrier; William D. Blackman

(57) ABSTRACT

A structure for attaching a stereoscopic camera to a vehicle, by which a plurality of cameras are attached to a body frame of the vehicle in order to stereoscopically capture images surrounding the vehicle; and the same structure includes a lateral stay for coupling the plurality of cameras with each other; and brackets for fixing the lateral stay or the plurality of cameras on the body frame, which are provided at a plurality of points, spaced from each other, of the lateral stay, or at the plurality of cameras fixed on the lateral stay; wherein the rigidity of at least a part of the brackets is lower than the bending rigidity of the lateral stay.

17 Claims, 6 Drawing Sheets

STRUCTURE FOR ATTACHING STEREOSCOPIC CAMERA IN VEHICLE

CROSS-REFERENCE TO RELATED APPLICATIONS

The present invention claims priority under 35 USC 119 based on Japanese patent application No. 2004-293576, filed Oct. 6, 2004, the content of which, including written description, claims, and drawings, is incorporated by reference herein.

BACKGROUND OF THE INVENTION

1. Field of the Invention

The present invention relates to a structure for mounting a camera to a vehicle, and in particular it relates to a structure for attaching a stereoscopic camera system for a vehicle by which a plurality of cameras are attached to a body frame of the vehicle in order to stereoscopically capture images of the area surrounding the vehicle.

2. Description of Related Art

A technology has been developed, which captures the images of an area surrounding a vehicle while the vehicle is running and when it stops, and the technology utilizes the image information for traveling Support, etc. As one of the representative technologies, a stereoscopic camera technology is known which stereoscopically recognizes the surrounding images on the basis of images captured by two cameras and grasps the positional relationship in front of and behind an object.

In such a structure for attaching a stereoscopic camera system, two cameras are attached to a vehicle body. One camera is attached on each end of a horizontally long lateral stay in order to prevent die optical axes of both cameras from deviating due to a distortion of a body of the vehicle, and only the middle part of the lateral stay is fixed in the body (For example, refer to Japanese Unexamined Patent Application, First Publication No. 2001-88623). That is, since the optical axes of the respective cameras are maintained so as to be constant by the lateral stay, and both the end portions of the lateral stay are not fixed on the vehicle, no bending stress is applied onto the lateral stay, resulting from distortion, etc., of the vehicle body.

However, since, with the above-described attaching structure, two cameras, which are heavy devices, are supported on the vehicle only at the middle part of the lateral stay, it is difficult to suppress looseness and shaking of the cameras.

In particular, when there is no way other than disposing both the cameras with a spacing secured therebetween in order to secure focal distances of the cameras (in this case, it is necessary to lengthen the lateral stay) and when cameras are installed at the front side of a vehicle subjected to large vibrations, there is a concern that looseness and shaking of the cameras are further increased.

SUMMARY OF THE INVENTION

The present invention provides a structure for attaching a stereoscopic camera system to a vehicle which is capable of preventing looseness and shaking of cameras, securely preventing the optical axes of the cameras from deviating as a result of distortion, etc., of the vehicle body, and improving the accuracy when stereoscopically recognizing the surrounding environment.

In a structure for attaching a stereoscopic camera system to a vehicle according to the invention, a plurality of cameras are attached to a body frame of the vehicle in order to stereoscopically capture images of the area surrounding the vehicle. The same attaching structure includes a lateral stay for coupling the plurality of cameras with each other, and brackets for fixing the lateral stay or the plurality of cameras on the body frame, The brackets are provided at a plurality of points, spaced from each other, of the lateral stay, or at the plurality of cameras fixed on the lateral stay. The rigidity of at least a part of the brackets is lower than the bending rigidity of the lateral stay.

According to the invention, since a plurality of points of the lateral stay, or respective cameras fixed on the lateral stay, are fixed on a body frame via the brackets, looseness and shaking of the cameras can be prevented. Also, even if distortion and deformation are brought about on the body frame that supports the lateral stay, the bracket, whose bending rigidity is lower, is deformed prior to the lateral stay, whose bending rigidity is higher, based on operating loads resulting from the distortion and deformation thereof. Moreover, no large load is applied to the lateral stay, wherein it is possible to prevent the optical axes of the cameras from deviating.

In the structure for attaching a stereoscopic camera for a vehicle according to the invention, it is preferable that the brackets are plate-shaped, and bending portions are provided in the brackets.

According to die invention, since a large allowance for deflection is secured by means of the brackets by providing the bending portions therein, load input from the body frame can be flexibly absorbed by deflection of the bending portions even if distortion and deformation are brought about in the body frame which supports the lateral stay.

In the structure for attaching a stereoscopic camera for a vehicle according to the invention, it is preferable that the brackets are provided with a reinforcement bead.

According to the invention, since the reinforcement bead is provided, the rigidity of the bracket can be adjusted. The rigidity of the bracket can be easily adjusted by varying the length, width, and depth of the reinforcement bead. Since the bead can be provided by very simple work, it is possible to quickly adjust the rigidity of the bracket. Further, since different rigidity can be given to the same bracket by varying the length, width and depth of the reinforcement bead, the same bracket is applicable to vehicles whose specifications differ from each other.

In the structure for attaching a stereoscopic camera for a vehicle according to the invention, it is preferable that the camera is an infrared camera.

Since the focusing distance of the infrared camera is long, it is necessary to space two cameras from each other by lengthening the lateral stay in order to form the image of a near object on the pickup surface of the cameras. According to the invention, since even a long lateral stay can be firmly fixed on the vehicle body, looseness and shaking of the cameras can be prevented from occurring.

In the structure for attaching a stereoscopic camera for a vehicle according to the invention, it is preferable that the body frame is includes a cross member. Each end of the cross member includes a bent portion which is bent diagonally upward. The terminal end of the bent portion is linked with side frames of the vehicle body at both sides of the engine room, and the brackets are fixed in the vicinity of the terminal end of the cross member.

If the side frame is deformed so as to open sideward by being heated by heat from the engine, the bent portions, formed at both ends of the cross member, are deformed so as to open both ends of the cross member. As a result there is a possibility that a large deformation load operates on the brackets which support the lateral stay. In such a case, according to the invention, the lateral stay is not deformed, but the bracket is deformed. Since no large load is input into the lateral stay, it is possible to prevent the optical axes of the cameras from deviating.

DETAILED DESCRIPTION OF THE INVENTION

Hereinafter, a description is given of one embodiment of the invention with reference to the drawings.

Figure 1:
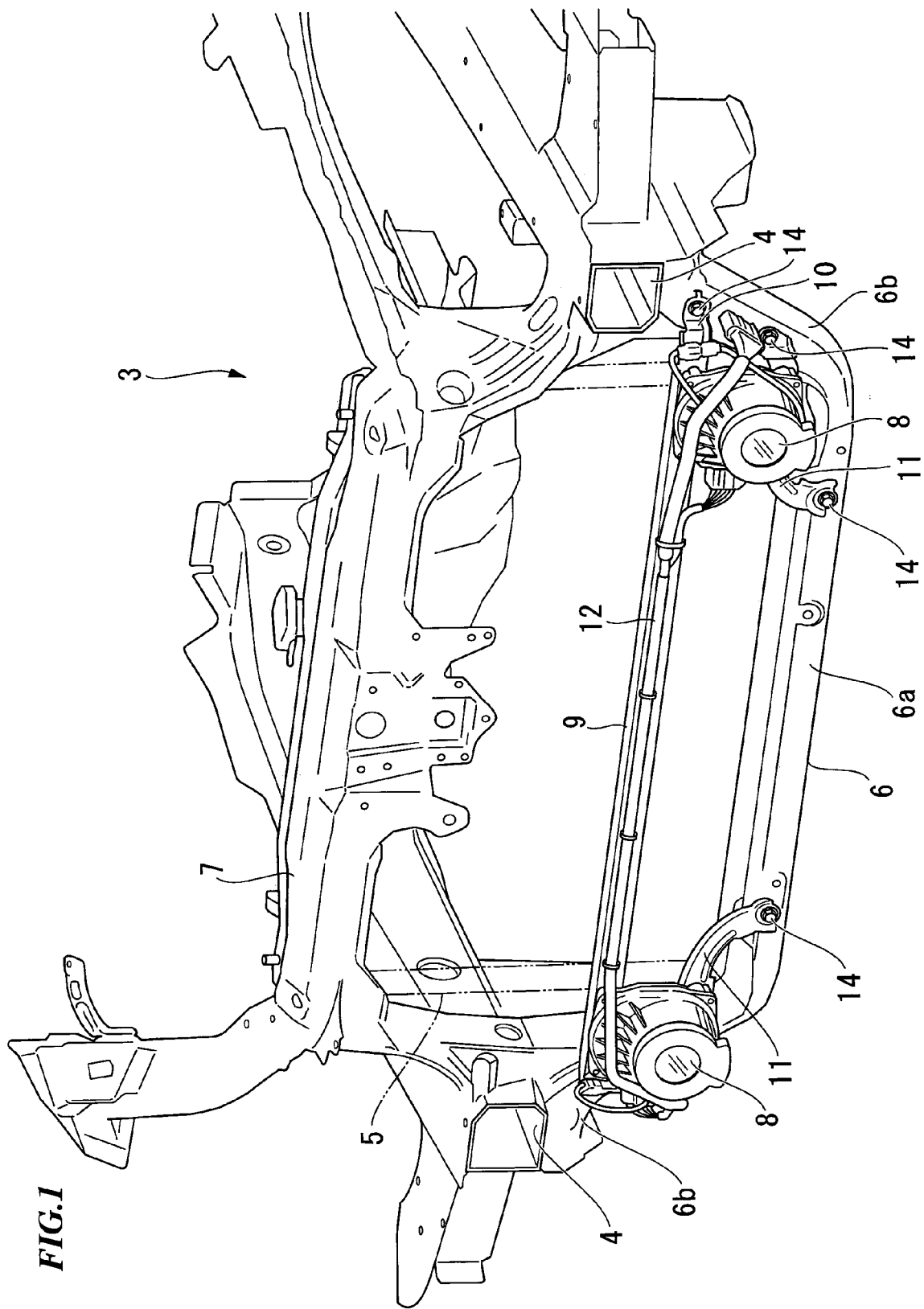
FIG. 1 is a perspective view of a front end of a vehicle body where the framework of a the vehicle body is exposed with the body panels and bumper, etc., removed.
Figure 2:
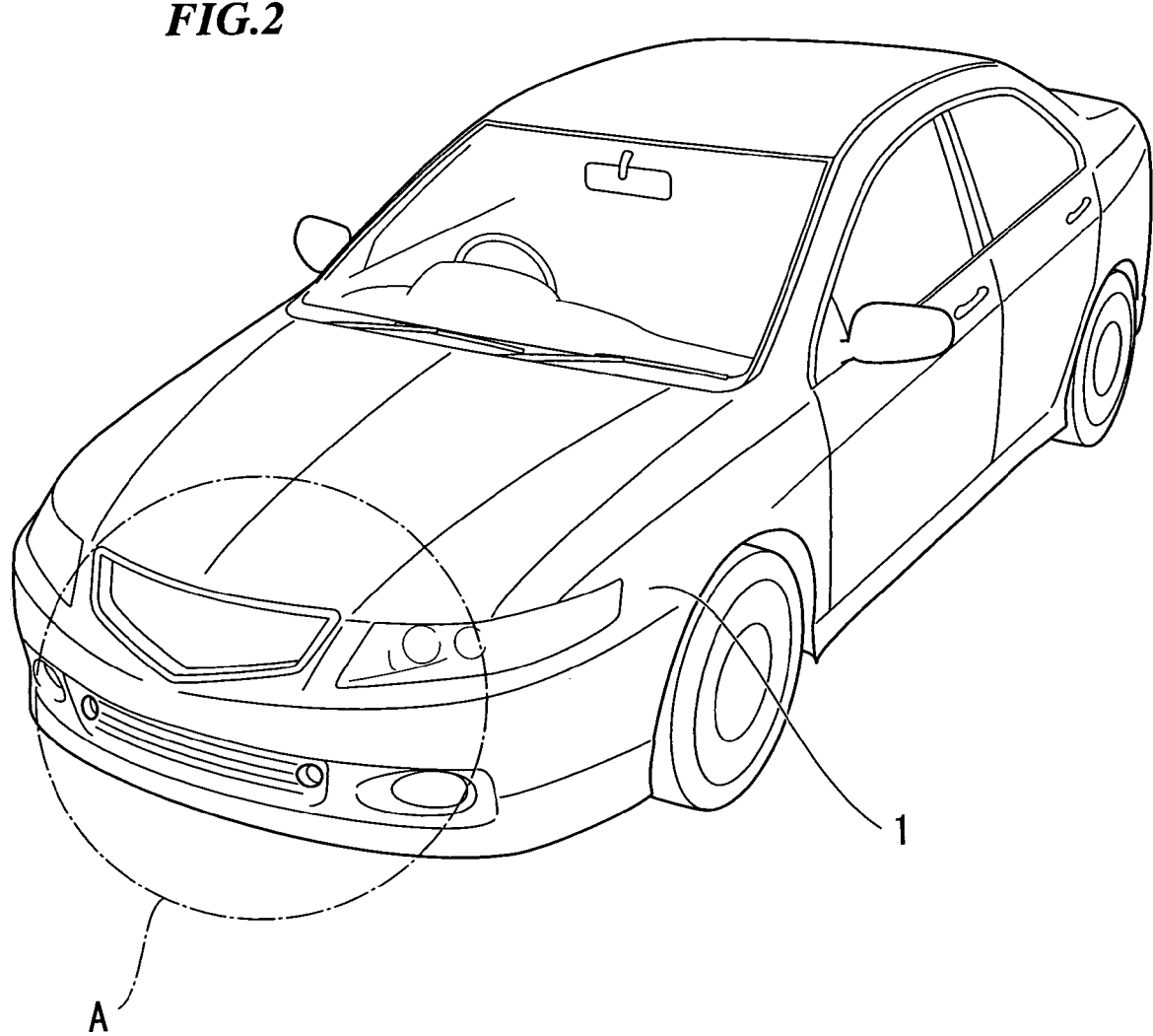
FIG. 2 is a perspective view of the front part of the vehicle body, the circle labeled A identifying the front end portion of FIG. 1.
Figure 3:
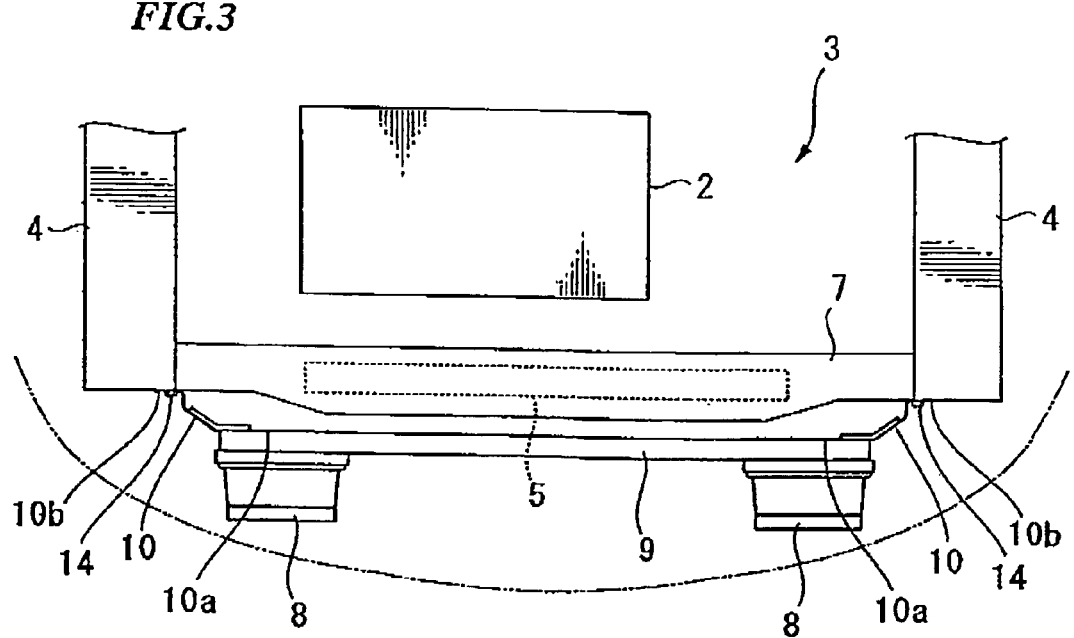
FIG. 3 is a plan view briefly of the framework of a vehicle body showing the upper bracket securing the lateral stay to the cross member adjacent to each of the vehicle side frames.
Figure 4:
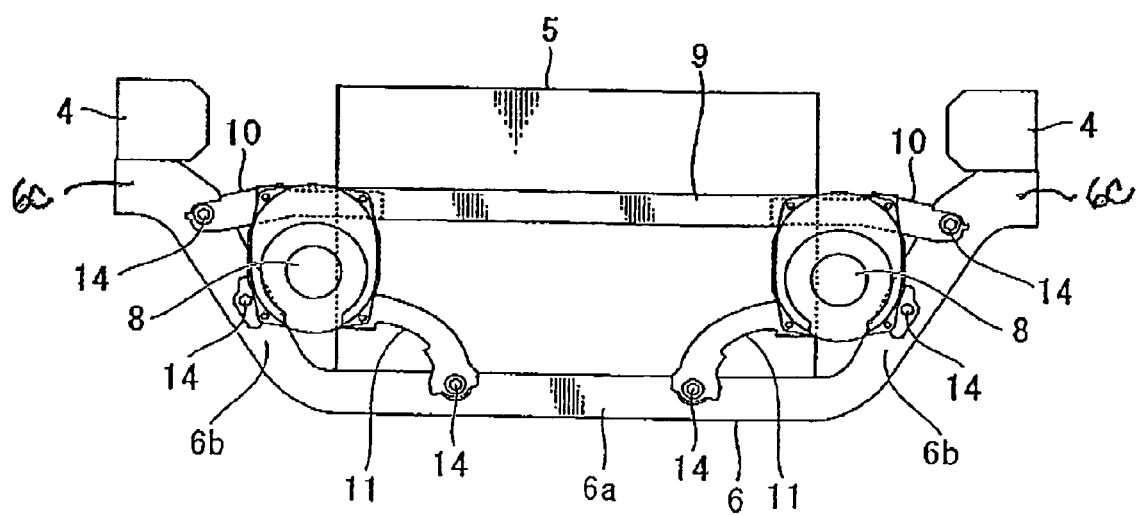
FIG. 4 is a front view briefly of the framework of a vehicle body showing an upper side of the camera secured to the upper bracket, and a lower side of the camera secured to the lower bracket, the lower bracket secured to the cross member at two locations.
Figure 5:
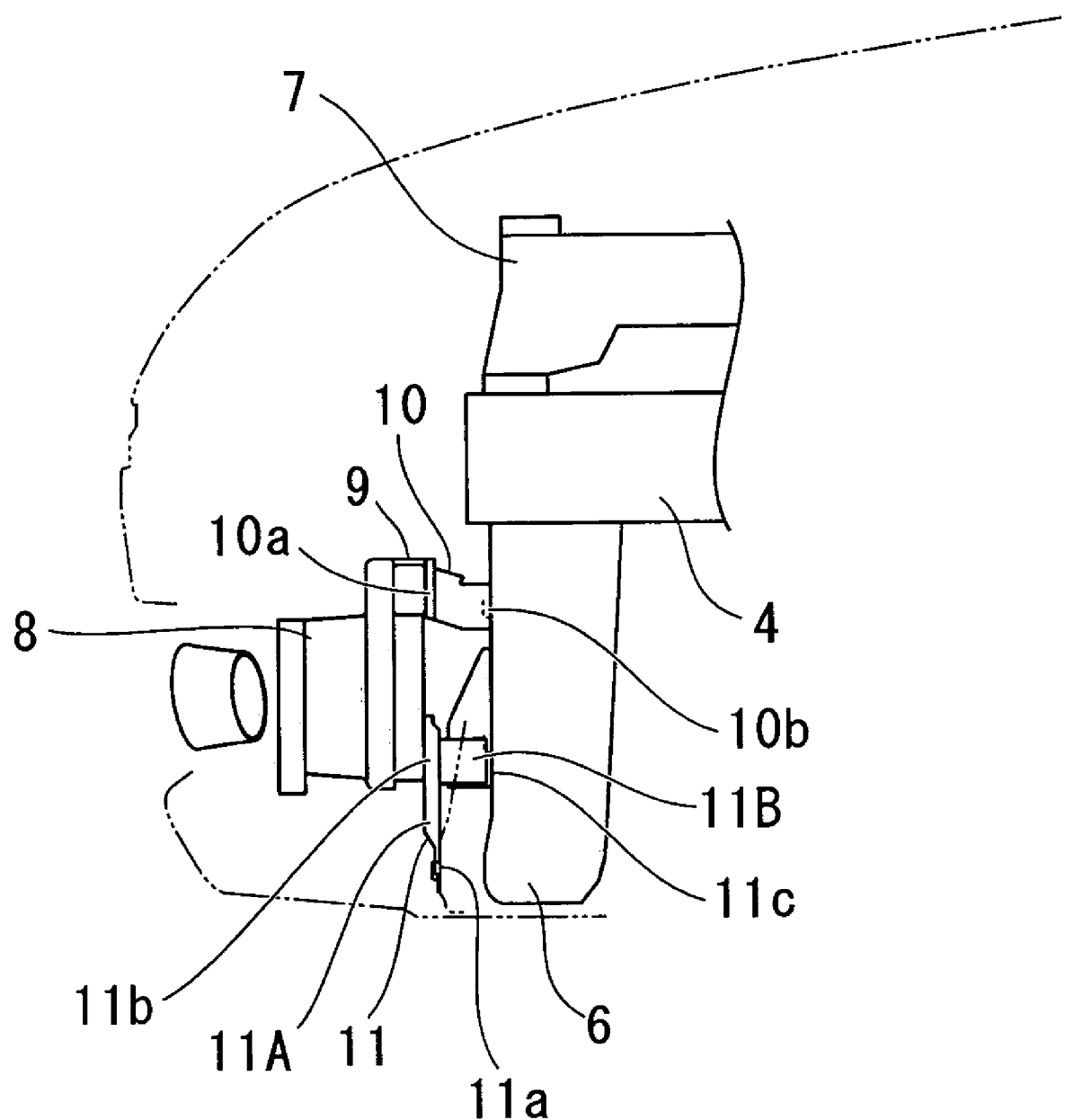
FIG. 5 is a side view briefly of the framework of a vehicle body showing that the brackets permit the lateral stay to be spaced forward of the cross member.

FIG. 1 is a perspective view of the front end of a vehicle in which the framework of a vehicle body is exposed with the body panels and bumper, etc., removed (the front part A of a vehicle 1 shown in FIG. 2), FIG. 3 is a brief plan view of the same framework, FIG. 4 is a brief front view of the same framework, and FIG. 5 is a brief side view of the same framework. In the drawings, reference numeral 2 denotes an engine, 4 denotes side frames, and 5 denotes a radiator. The side frames 4 are composed as a pair and extend in the longitudinal direction of the vehicle body at both sides of the engine room 3. The radiator 5 cools down the engine coolant.

The front end part of one side frame 4 is linked with the front end part of the other side frame 4 by a bulkhead lower cross member 6 (the cross member that composes the invention, and hereinafter called a "lower cross member 6") and a bulkhead upper frame 7 (hereinafter called an "upper frame 7). The middle part of the lower cross member 6 in its lengthwise direction supports the lower part of the radiator 5, and the middle pan of the upper frame 7 in its lengthwise direction supports the upper part of the radiator 5. The section of the lower cross member 6 and the section of the upper frame 7 are both closed in shape.

The middle part of the lower cross member 6 in its lengthwise direction is curved downward, and the middle part of the upper frame 7 in its lengthwise direction is curved upward, and an air intake space is secured forward of the radiator 5 between the lower cross member 6 and the upper frame 7. In detail, for example, both ends 60 of a member base portion 6a of the lower cross member 6 are bent diagonally upward toward the side frames 4 with respect to the member base portion 6a horizontally extending in the vehicle width direction (hereinafter called a "side inclined portion 6b"), and respective terminal ends 6C of the side inclined portion 6b of the lower cross member 6 are further bent outward in the vehicle width direction and are linked with the lower surface of the side frames 4.

A far-infrared camera 8 (hereinafter called a "camera 8") is employed as a stereoscopic camera installed in the vehicle. Two cameras 8 are provided so as to be composed as a pair. The respective cameras 8 are linked with each other by a lateral stay 9 extending in the vehicle width direction, and are attached to the lower cross member 6 via an upper bracket 10 and a lower bracket 11.

Figure 6:
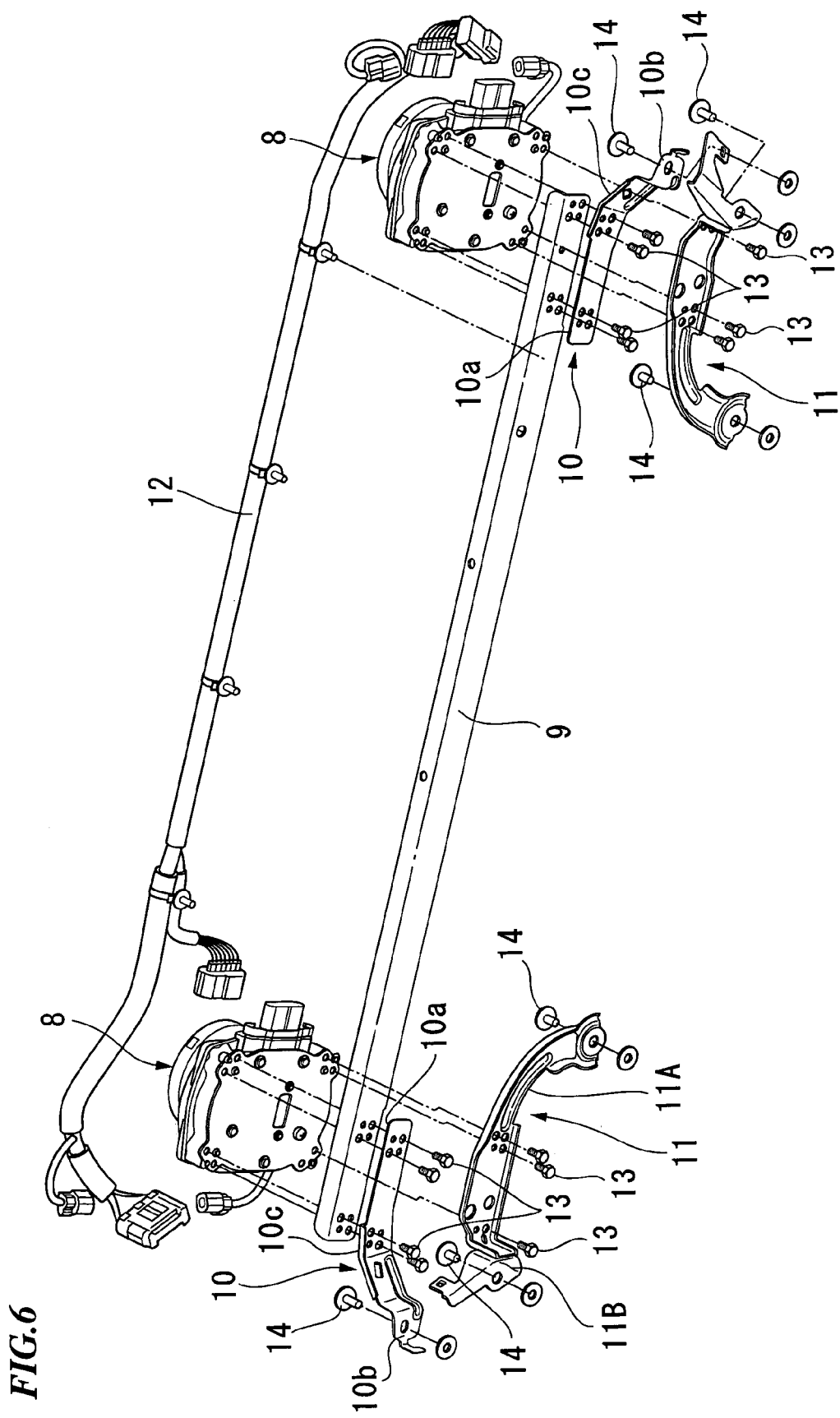
FIG. 6 is an exploded perspective view of the framework of a vehicle body.

As shown in FIG. 1 and FIG. 6, the lateral stay 9 is composed of a square pipe made of metal such as aluminum, iron, etc. The front part wall and the lower part wall at both side edges of the lateral stay 9 are notched, and the upper edges of the rear parts of the respective cameras 8 are fixed on the front side of the remaining rear part wall. Also, a bundle 12 of signal cables connected to both the cameras 8 is fixed at the intermediate part of the lateral stay 9 in its lengthwise direction, using clips.

Figure 7:
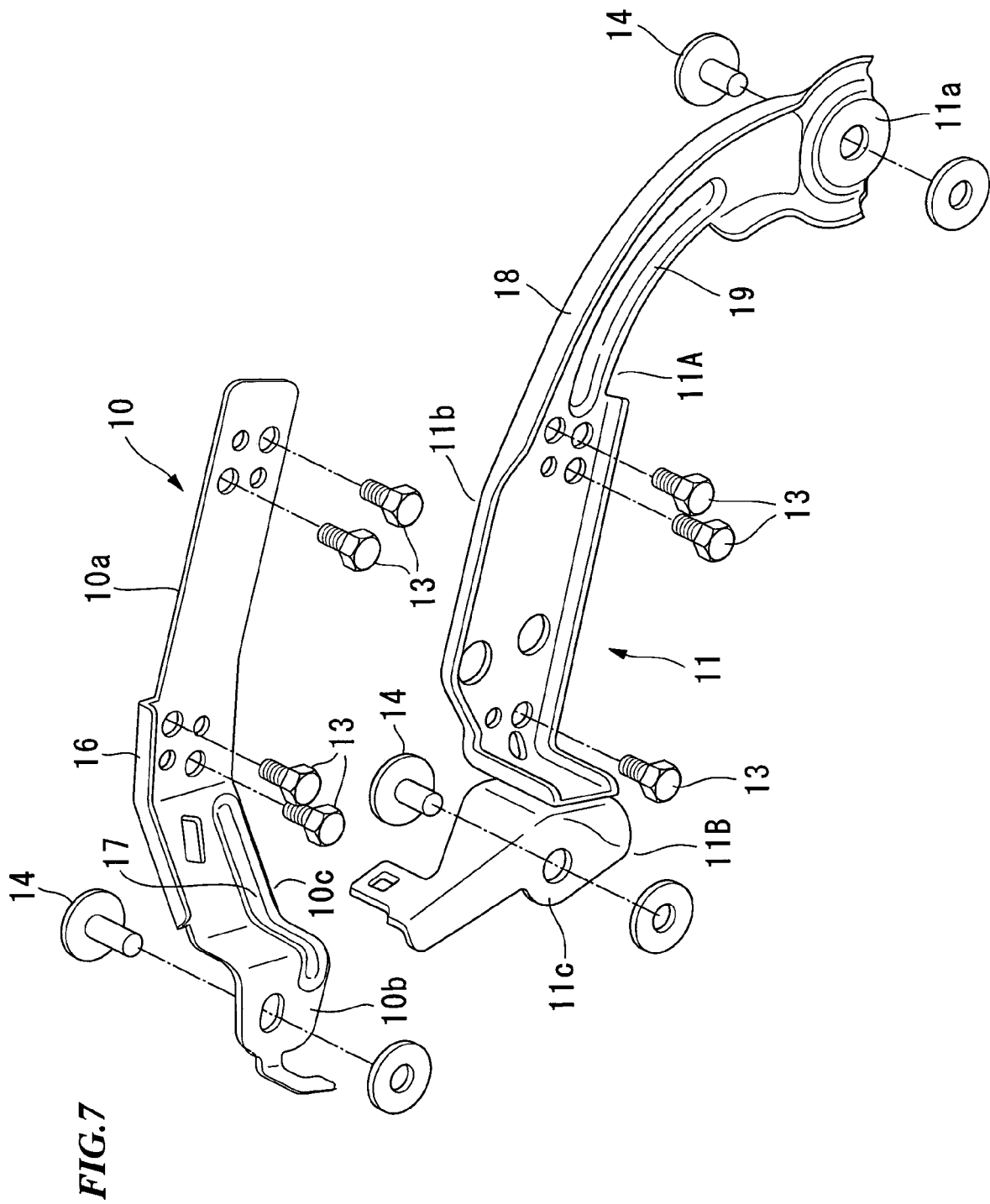
FIG. 7 is an exploded perspective view showing some of the components shown in FIG. 6.

As shown in FIG. 6 and FIG. 7, the upper bracket 10 and the lower bracket 11 are formed of metal such as aluminum, etc. The upper edges of the rear part of the respective cameras 8 are fixed at the side inclined portion 6b (Refer to FIG. 4) of the lower cross member 6 via the lateral stay 9 and the upper bracket 10. The rigidity of the entirety or a part of the upper bracket 10 is lower than the bending rigidity of the lateral stay 9. Further, the rigidity of the entirety or a part of the lower bracket 11 is lower than the bending rigidity of the lateral stay 9. Also, the rigidities of the respective brackets may be given by the shapes thereof and may be given by the material thickness or the material quality thereof.

The upper bracket 10 is formed, as shown in FIG. 7, by folding down a band-shaped metal plate at a plurality of points. A camera attaching plane 10a for attachment to the camera is provided at the front side of one end part of the upper bracket 10, and a vehicle body attaching plane 10b for attachment to the vehicle body is provided at the rear side of the other end part of the upper bracket 10. As shown in FIG. 6, one end part of the upper bracket 10 at which the camera attaching plane 10a is disposed, is secured to the upper edge of the camera 8 by bolts 13 along with the end part of the lateral stay 9. The other end part of the upper bracket 10, at which the vehicle body attaching plane 10b is disposed, is secured at the vicinity of the upper part of the side inclined portion 6b of the lower cross member 6 by the bolts 14 (Refer to FIG. 4).

In addition, in the present embodiment, the upper bracket 10 is folded about a vertical axis at three points, and the respective folds provide a bending portion 10c to increase the amount of deformation of the upper bracket 10. A reinforcement flange 16 is bent and formed at one side edge of the upper bracket 10 along its lengthwise direction so that it extends over the end edge of the camera attaching plane 10a and a part of the bending portion 10c. A reinforcement bead 17 is formed at the other side edge of the upper bracket 10 so that it extends over the end edge of the vehicle body attaching plane 10b and a part of the bending portion 10c. In the embodiment, the entirety of the upper bracket 10 is press-formed.

The lower bracket 11 is composed of a bracket body 11A and a sub-bracket 11B coupled to the bracket body 11A. The bracket body 11A formed by press-forming a large-sized metal plate is formed so as to be roughly circular arc-shaped when being observed from its front side. A first plane 11a, permitting attachment to the vehicle body, is provided at the rear side of one end part of the bracket body 11A. The section or the sub-bracket 11B formed by press-forming a metal plate is formed so as to be L-shaped. A second plane 11c, also permitting attachment to the vehicle body is provided at the rear side of the bottom wall of the sub-bracket 11B.

As shown in FIG. 4, one end part of the bracket body 11A, at the location in which the first plane 11a is to be attached to the vehicle body, is secured to the member base portion 6a of the lower cross member 6 by bolts 14. An attaching plant 11b permitting attachment to the camera is provided at the front side of the other end part of the bracket body 11A. The terminal end of the other end part of the bracket body 11A is roughly orthogonally folded, and the sub-bracket 11B is coupled thereto. The lower edge part of the camera 8 is secured to the attaching plane 11b to the camera, of the bracket body 11A by bolts 13. The sub-bracket 11B is secured to a roughly intermediate position of the side inclined portion of the lower cross member 6. In addition, a reinforcement flange 18 and a reinforcement bead 19 are suitably formed on the bracket body 11A of the lower bracket 11.

In the structure for attaching a stereoscopic camera, which is constructed as described above, for example, when both side frames 4 are deformed so as to open outward in the vehicle width direction upon receiving heat from the engine 2, both ends of the lower cross member 6 are pulled outward due to deformation of the side frames 4, and the respective side inclined portions 6b are apt to be deformed outward. At this time, a load operates on the upper bracket 10 and the lower bracket 11 for fixing the camera 8 and the lateral stay 9 on the lower cross member 6. However, the load can be absorbed by deformation of both the brackets 10 and 11 having a lower rigidity than that of the lateral stay 9. Therefore, no great bending load will operate on the lateral stay 9. In particular, in the upper bracket 10 coupled to the vicinity of the upper end of the side inclined portion 6b of the lower cross member 6, low rigidity portions composed of a plurality of bending portions 10c have a great allowance for deflection. Since these portions are deformed with allowance, a great load operated from the lower cross member 6 can be effectively absorbed.

The above description describes the case when both the side frames 4 are deformed so as to open outward upon receiving heat from the engine 2. In addition, when heat from the engine 2 is transmitted onto one side of the side frames 4, and the left and right side frames 4 are unevenly deformed sideward or forward, it is possible for the brackets 10 and 11 to effectively absorb the load operating on the lateral stay 9 as well. Further, even in a case when the body frame is deformed by not only thermal deformation of the body frame such as the side frames 4 but also vibration, shock, etc., during traveling, it is possible for the brackets 10 and 11 to effectively absorb the load.

Therefore, according to the structure for attaching the above-described stereoscopic camera, since the deformation of the lateral stay 9 is suppressed even if the load operates from outside, the deviation of the optical axes of the cameras 8 can be eliminated, wherein it is possible to improve the accuracy when stereoscopically recognizing the surrounding images.

Also, basically, since the attaching structure of a stereoscopic camera fixes both ends of the lateral stay 9 on the lower cross member 6, which is the body frame, via the brackets 10 and 11, looseness and shaking of the cameras 8 can be prevented without fail. Therefore, in the structure for attaching a stereoscopic camera, no inconveniences such as looseness and shaking of the cameras 8 occur in spite of the cameras 8 being spaced from each other due to employment of far-infrared cameras whose focal distance is long, and both the cameras 8 being linked with each other by a long lateral stay 9. Further, even if the cameras 8 are disposed forward of the engine room 3 where large vibrations are generated, no inconveniences such as looseness and shaking of the cameras are brought about as well.

The bending portions 10c of this embodiment are formed by folding the bracket 10 toward the thickness direction of the bracket 10. However, the bending portions of the present invention may be formed by folding the bracket 10 toward the width direction of the bracket 10.

In the structure for attaching the stereoscopic camera, a reinforcement bead 17 is formed at the folded portion 10c of the upper bracket 10. The rigidity of the upper bracket 10 can be easily tuned by varying the length, width and depth of the reinforcement bead 17. Therefore, it is possible to quickly and adequately adjust the rigidity of the bracket 10. Also, there is an advantage by which the bracket 10 can be easily applied to vehicles having different specifications only by varying the reinforcement bead 17.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, although, in the embodiment, a far-infrared camera is employed as a stereoscopic camera, the stereoscopic camera is not limited to the far-infrared camera, wherein a camera utilizing visible light may be employed.

What is claimed is:

1. A structure for attaching a stereoscopic camera system to a vehicle, by which a plurality of cameras are attached on a body frame of the vehicle in order to stereoscopically capture images of an area surrounding the vehicle; the structure comprising:
a lateral stay for coupling the plurality of cameras to each other; and
brackets for fixing at least one of the lateral stay and the plurality of cameras on the body frame, the brackets provided at a plurality of points on at least one of the lateral stay and the plurality of cameras fixed on the stay; wherein
the rigidity of at least a part of the brackets is lower than the bending rigidity of the lateral stay; and
said lateral stay is connected to the body frame only through said brackets.

2. The structure for attaching a stereoscopic camera system to a vehicle of claim 1, wherein
the brackets are plate-shaped, and bending portions are provided in the brackets.

3. The structure for attaching a stereoscopic camera system to a vehicle of claim 1, wherein
the brackets are provided with a reinforcement bead.

4. The structure for attaching a stereoscopic camera system to a vehicle of claim 1, wherein
the camera is an infrared camera.

5. The structure for attaching a stereoscopic camera system to a vehicle of claim 1, wherein
the body frame comprises a cross member and side frames, both ends of the cross member comprising a bent portion, which is bent diagonally upward, and a terminal end of the bent portion is linked with the side frames at both sides of an engine room; and
the brackets are fixed in the vicinity of the terminal end of the bent portion of the cross member.

6. The structure for attaching a stereoscopic camera system to a vehicle of claim 1, wherein the brackets are provided at each of the plurality of cameras.

7. A structure for attaching a stereoscopic camera system including a plurality of cameras to a vehicle, the structure comprising:
- an elongate rigid stay, the stay extending in the width direction of the vehicle,
- a plurality of brackets securing the plurality of cameras to the stay and adapted to secure the stay to a body frame of the vehicle, wherein the brackets are spaced apart along the stay, the vehicle body frame comprises a cross member extending in the width direction of the vehicle, and a pair of parallel side frames extending perpendicularly to the cross member and supporting opposed ends of the cross member, and the brackets secure ends of the stay to the cross member adjacent the side frames.

8. The structure for attaching a stereoscopic camera system to a vehicle of claim 7, wherein the brackets comprise a first rigidity and the stay comprises a second rigidity, wherein the first rigidity is less than the second rigidity.

9. The structure for attaching a stereoscopic camera system to a vehicle of claim 7, wherein the brackets comprise an upper bracket and a lower bracket for each camera, an upper end of each camera secured to an upper bracket, and a lower end of each camera secured to a lower bracket.

10. The structure for attaching a stereoscopic camera system to a vehicle of claim 9, wherein a first end of the upper bracket is secured to an end of the stay, and a second end of the upper bracket is secured to the cross member.

11. The structure for attaching a stereoscopic camera system to a vehicle of claim 9, wherein the upper bracket comprises a bending portion.

12. The structure for attaching a stereoscopic camera system to a vehicle of claim 9, wherein
the cross member comprises a mid section extending between opposed ends,
the ends of the cross member comprise a bent portion which bends diagonally upward, and
a terminal end of the bent portion is fixed to the side frames,
wherein the lower bracket comprises a first end secured to the mid section of the cross member, and a second end secured to the bent portion of the cross member.

13. The structure for attaching a stereoscopic camera system to a vehicle of claim 9, wherein the lower bracket comprises a bracket body and a sub-bracket, and wherein the bracket body is a substantially circular arc in shape, and the sub-bracket is fixed to one end of the bracket body, and is L-shaped.

14. The structure for attaching a stereoscopic camera system to a vehicle of claim 7, wherein
the brackets are provided with a reinforcement bead.

15. The structure for attaching a stereoscopic camera system to a vehicle of claim 1, wherein said brackets are adapted to deform prior to the lateral if the vehicle body frame becomes deformed.

16. The structure for attaching a stereoscopic camera system to a vehicle of claim 7, wherein said lateral stay is connected to the body frame only through said brackets.

17. The structure for attaching a stereoscopic camera system to a vehicle of claim 7, wherein said brackets arc adapted to deform prior to the lateral if the vehicle body frame becomes deformed.

* * * * *